US006999789B2

United States Patent
Hattori

(10) Patent No.: US 6,999,789 B2
(45) Date of Patent: Feb. 14, 2006

(54) MOBILE COMMUNICATION TERMINAL CAPABLE OF DISPLAYING COMMUNICATION MODE

(75) Inventor: Kiyoshi Hattori, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 410 days.

(21) Appl. No.: 10/323,838

(22) Filed: Dec. 20, 2002

(65) Prior Publication Data

US 2003/0119454 A1 Jun. 26, 2003

(30) Foreign Application Priority Data

Dec. 20, 2001 (JP) .............................. 2001-388281

(51) Int. Cl.
*H04M 1/00* (2006.01)
(52) U.S. Cl. .................... 455/552.1; 455/434; 455/450
(58) Field of Classification Search ............. 455/452.2, 455/453, 450, 452.1, 552.1, 456.3, 434, 435.1, 455/436
See application file for complete search history.

(56) References Cited

U.S. PATENT DOCUMENTS

| 5,845,215 | A | * | 12/1998 | Henry et al. ............. 455/426.1 |
| 5,950,130 | A | * | 9/1999 | Coursey .................. 455/432.1 |
| 6,167,283 | A | * | 12/2000 | Korpela et al. ............. 455/525 |
| 6,526,277 | B1 | * | 2/2003 | Zicker et al. ............ 455/426.2 |
| 2002/0111187 | A1 | * | 8/2002 | Harada et al. ............. 455/553 |
| 2003/0174685 | A1 | * | 9/2003 | Hasebe ....................... 370/338 |

* cited by examiner

*Primary Examiner*—Sonny Trinh

(74) *Attorney, Agent, or Firm*—Banner & Witcoff, Ltd.

(57) ABSTRACT

In a mobile communication terminal connectable to a first base station using a first communication mode and a second base station using a second communication mode that is different from the first communication mode, a control message coming from an acquired one of the first and second base stations is received. Based on the received control message, the communication mode used in the base station is recognized, and information indicative of the recognized communication mode is informed to the user.

19 Claims, 7 Drawing Sheets

EXTENDED SYSTEM PARAMETERS MESSAGE

| FIELD | LENGTH(BITS) |
|---|---|
| PILOT_PN | 9 |
| CONFIG_MSG_SEQ | 6 |
| DELETE_FOR_TMSI | 1 |
| USE_TMSI | 1 |
| PREF_MSID_TYPE | 2 |
| MCC | 10 |
| IMSI_11_12 | 7 |
| TMSI_ZONE_LEN | 4 |
| TMSI_ZONE | 8xTMSI_ZONE_LEN |
| BCAST_INDEX | 3 |
| IMSI_T_SUPPORTED | 1 |
| P_REV | 8 |
| MIN_P_REV | 8 |
| SOFT_SLOPE | 6 |
| ADD_INTERCEPT | 6 |
| DROP_INTERCEPT | 6 |
| PACKET_ZONE_ID | 8 |
| MAX_NUM_ALT_SO | 3 |
| RESELECT_INCLUDED | 1 |
| EC_THRESH | 0or5 |
| EC_IO_THRESH | 0or5 |
| PILOT_REPORT | 1 |
| NGHBR_SET_ENTRY_INFO | 1 |
| ACC_ENT_HO_ORDER | 0or1 |
| NGHBR_SET_ACCESS_INFO | 1 |
| ACCESS_HO | 0or1 |
| ACCESS_HO_MSG_RSP | 0or1 |
| ACCESS_PROBE_HO | 0or1 |
| ACC_HO_LIST_UPD | 0or1 |
| ACC_PROBE_HO_OTHER_MSG | 0or1 |
| MAX_NUM_PROBE_HO | 0or3 |
| NGHBR_SET_SIZE | 0or6 |

P1 points to P_REV

FIG. 4

EXTENDED HANDOFF DIRECTION MESSAGE

| FIELD | LENGTH(BITS) |
|---|---|
| USE_TIME | 1 |
| ACTION_TIME | 6 |
| HDM_SEQ | 2 |
| SEARCH_INCLUDED | 1 |
| SRCH_WIN_A | 0 or 4 |
| T_ADD | 0 or 6 |
| T_DROP | 0 or 6 |
| T_COMP | 0 or 4 |
| T_TDROP | 0 or 4 |
| HARD_INCLUDED | 1 |
| FRAME_OFFSET | 0 or 4 |
| PRIVATE_LCM | 0 or 1 |
| RESET_L2 | 0 or 1 |
| RESET_FPC | 0 or 1 |
| SERV_NEG_TYPE | 0 or 1 |
| ENCRYPT_MODE | 0 or 2 |
| NOM_PWR_EXT | 0 or 1 |
| NOM_PWR | 0 or 4 |
| NUM_PREAMBLE | 0 or 3 |
| BAND_CLASS | 0 or 5 |
| CDMA_FREQ | 0 or 11 |
| ADD_LENGTH | 3 |
| ADDITIONAL FIELDS | 8 x ADD_LENGTH |

ONE OR MORE OCCURRENCES OF THE FOLLOWING RECORD:

| PILOT_PN | 9 |
|---|---|
| PWR_COMB_IND | 1 |
| CODE_CHAN | 8 |

IF THE ADD_LENGTH FIELD IS NOT EQUAL TO '000', THE BASE STATION SHALL INCLUDE THE FOLLOWING FIELDS AS ADDITIONAL FIELDS.

| P2~ P_REV | 8 |
|---|---|

FIG. 6

MOBILE COMMUNICATION TERMINAL CAPABLE OF DISPLAYING COMMUNICATION MODE

CROSS-REFERENCE TO RELATED APPLICATIONS

This application is based upon and claims the benefit of priority from the prior Japanese Patent Application No. 2001-388281, filed Dec. 20, 2001, the entire contents of which are incorporated herein by reference.

BACKGROUND OF THE INVENTION

1. Field of the Invention

The present invention relates to a mobile communication terminal capable of being connected to a plurality of kinds of base stations that use different communication modes.

2. Description of the Related Art

In general, a mobile communication system includes a plurality of base stations which are distributed over the service area. A mobile communication terminal selects one of the base stations, which has the best condition for communication and acquires the selected base station. Thereby, radio communication is enabled.

In the mobile communication system, there may be a case where a part of the standards of the communication mode is upgraded while the system is being in operation. For example, in mobile communication systems using CDMA (Code Division Multiple Access), a preparation is now progressing to upgrade IS95A/IS95B standards to IS2000-1X standards designed to increase a data communication speed, while basic portions of the IS95A/IS95B standards remain unchanged.

It is not possible, however, to upgrade the standards of the communication mode for all the base stations of the system at the same time. In general, the standards are upgraded step by step. Consequently, base stations with different standards are mixedly present in the service area until completion of the work for upgrading the standards for all base stations.

If a mobile communication terminal corresponding to both old and new standards is to start information communication in this state, it is uncertain whether the terminal is connected to a base station with new standards or a base station with old standards, depending on the conditions for communication, such as the current location of the terminal or the condition of radio waves. For example, if the mobile communication terminal of a use who wishes high-speed data communication is connected to a base station with old standards, a longer time than expected may be consumed until completion of data communication, or a high communication charge may occur. This is very disadvantageous.

BRIEF SUMMARY OF THE INVENTION

The object of the present invention is to provide a mobile communication terminal that enables a user to confirm in advance a usable communication mode at the time of starting information communication, thereby preventing undesired information communication from being performed.

According to an aspect of the present invention, there is provided a mobile communication terminal connectable to a first base station using a first communication mode and a second base station using a second communication mode that is partly upgraded from the first communication mode. The terminal includes acquisition means for acquiring one of the first and second base stations and indication means for indicating the communication mode. The communication mode used in the base station is recognized from a control message coming from the base station acquired by the acquisition means. Information representative of the recognized communication mode is informed to the user of the mobile communication terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows an example of a format of system parameter messages used in the communication mode display control shown in FIG. 3;

FIG. 6 shows an example of a format of handoff direction messages used in the communication mode display control illustrated in FIG. 5;

DETAILED DESCRIPTION OF THE INVENTION

An embodiment of a mobile communication terminal according to the present invention will now be described with reference to the accompanying drawings.

Figure 1:
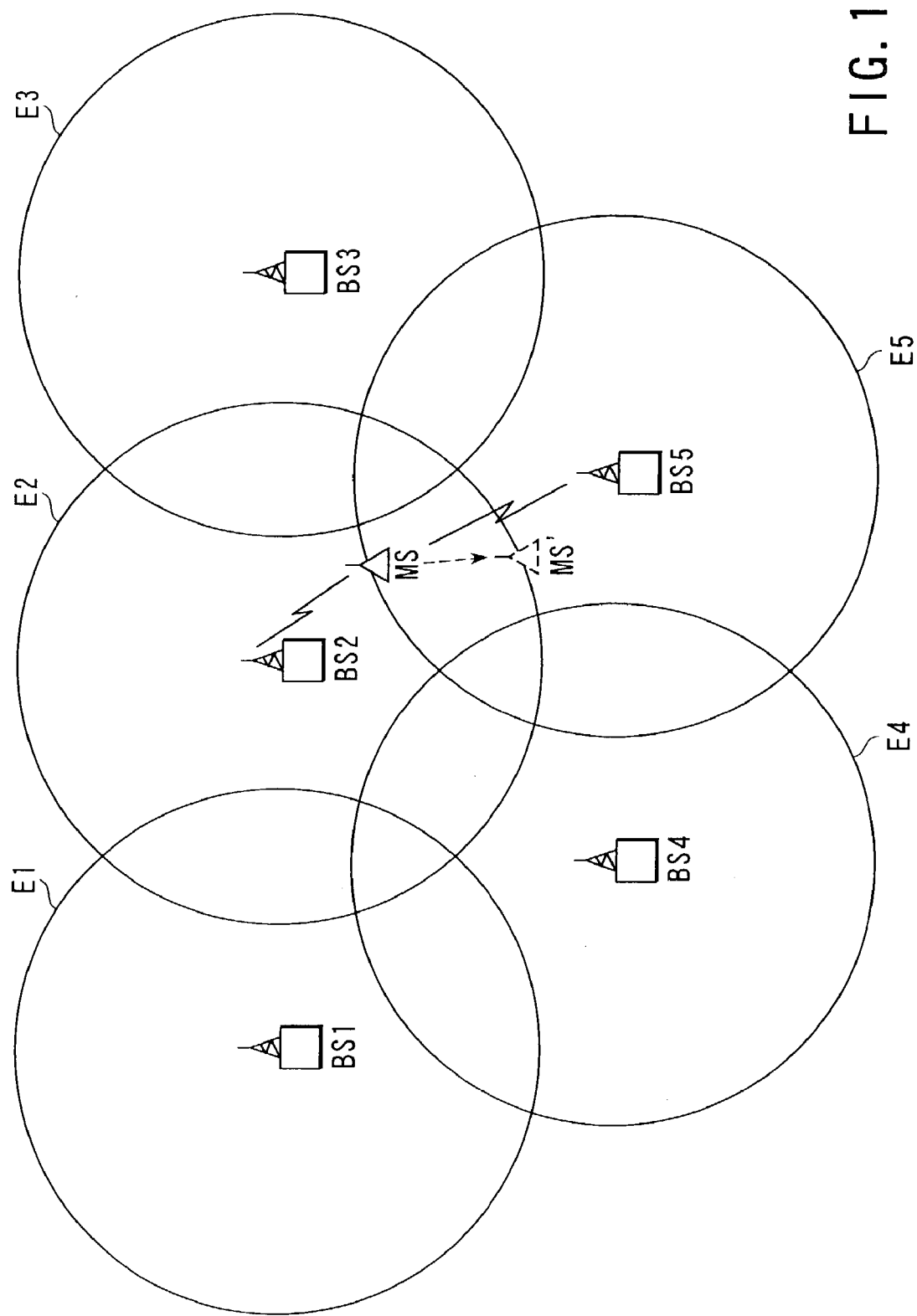
FIG. 1 schematically shows the structure of a mobile communication system according to an embodiment of the present invention.

FIG. 1 schematically shows the structure of a mobile communication system adopting a CDMA (Code Division Multiple Access) method according to an embodiment of the invention.

A plurality of base stations BS1, BS2, . . . , are distributed in a service area covered by the mobile communication system. The base stations BS1, BS2, . . . , form radio communication areas E1, E2, . . . , respectively, which are called cells. A mobile communication terminal MS serving as a mobile station is connected to the nearest base station via a radio channel.

The base stations BS1, BS2, . . . , are classified into a first base station group using a first communication mode, and a second base station group using a second communication mode that includes an upgraded part of the standard of the first communication mode. For example, the first base station group uses IS95A or IS95B which is a CDMA standard, and the second base station group uses IS2000-1X that is formed by adding a high-speed data transmission mode to the IS95A or IS95B standard.

The mobile communication terminal MS has functions corresponding to both communication modes of IS95A or IS95B and IS2000-1X. In addition, the mobile communication terminal MS has functions corresponding to a personal mobile communication system using CDMA, which is represented by PCS (Personal Communication System), and to an analog mobile phone system using an analog communication mode, which is represented by AMPS (Advanced Mobile Phone System).

Figure 2:
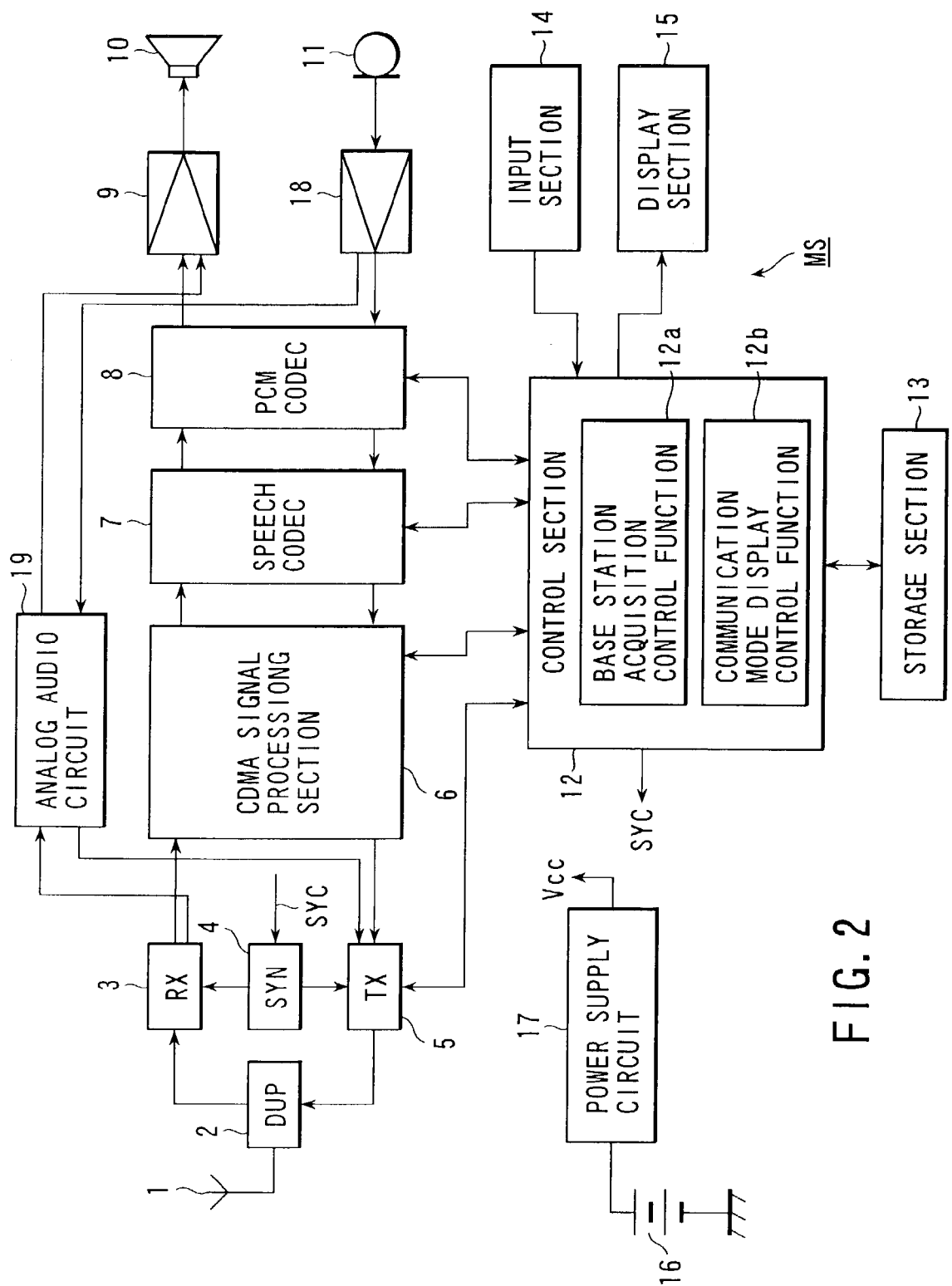
FIG. 2 is a block diagram showing the structure of a mobile communication terminal according to an embodiment of the invention.

FIG. 2 is a block diagram showing the functional structures of the mobile communication terminal MS.

In FIG. 2, a radio signal sent from the base station BS1, BS2, . . . , is received by an antenna 1 and input to a reception circuit (RX) 3 via a duplexer (DUP) 2. In the reception circuit 3, the radio signal is mixed with a reception local oscillation signal produced from a frequency synthesizer (SYN) 4 and is down-converted to an intermediate frequency signal or a baseband signal. The frequency of the reception local oscillation signal produced from the frequency synthesizer 4 is instructed by a control signal SYC from a control section 12.

The reception intermediate-frequency signal or reception baseband signal is input to a CDMA signal processing section 6 when the communication mode is set to be a digital mode using CDMA, or to an analog audio circuit 19 when the communication mode is set to be an analog mode.

The CDMA signal processing section 6 subjects the input reception intermediate frequency signal or reception baseband signal to a quadrature demodulation process and a despread spectrum process using a spread code assigned to a reception channel. Thereby, demodulated data corresponding to a data rate is obtained. The demodulated data is input to a speech codec 7. Control data indicative of a data rate, which is included in the demodulated data, is input to the control section 12.

The speech codec 7 subjects the demodulation data output from the CDMA signal processing section 6 to an expansion process corresponding to the reception data rate informed from the control section 12. In addition, the speech codec 7 subjects the expanded data to a decoding process using Viterbi decoding, etc. and an error correction decoding process, thereby reproducing baseband reception digital data.

A PCM codec 8 performs different signal processing according to a communication type (voice communication or data communication) informed from the control section 12. Specifically, in the voice communication mode, the PCM codec 8 performs PCM decoding of the reception digital data output from the speech codec 7 and produces an analog reception call signal. The analog reception call signal is amplified by a reception call amplifier 9 and output from a loudspeaker 10. On the other hand, in the data communication mode, the reception digital data from the speech codec 7 is fed to the control section 12. The control section 12 stores the reception digital data in a storage section 13 and causes it to be displayed on a display section 15.

The reception digital data, where necessary, may be transferred to an external information terminal device (not shown) such as a personal digital assistant (PDA) or a notebook personal computer via an external interface (not shown).

On the other hand, the analog audio circuit 19 analog-demodulates the input reception intermediate frequency signal through an FM detector and reproduces an analog reception call signal. The analog reception call signal is amplified by the reception call amplifier 9 and output from the loudspeaker 10.

An input voice of the speaker in the voice communication mode is input through a microphone 11 as an analog transmission call signal. The analog transmission call signal is amplified up to a proper level by a transmission call amplifier 18. When the digital mode is set as the communication mode, the amplified signal is input to the PCM codec 8. When the analog mode is set as the communication mode, the amplified signal is input to the analog audio circuit 19.

The PCM codec 8 subjects the input analog transmission call signal to a PCM encoding process. The transmission data thus produced is supplied to the speech codec 7. In addition, data produced from the external information terminal device is input to the control section 12 via the external interface (not shown). The data is then delivered from the control section 12 to the speech codec 7 via the PCM codec 8.

In the voice communication mode, the speech codec 7 detects an energy amount of the input voice on the basis of transmission voice data produced from the PCM codec 8. Based on the detection result, the speech codec 7 determines the data rate. The speech codec 7 compresses the transmission data to a burst signal of a format corresponding to the data rate, and subjects it to an error correction encoding process. The speech codec 7 delivers the resultant data to the CDMA signal processing section 6. On the other hand, in the data communication mode, the speech codec 7 compresses the transmission data from the PCM codec 8 to a burst signal of a format corresponding to a preset data rate and subjects it to an error correction encoding process. The speed codec 7 delivers the resultant data to the CDMA signal processing section 6. The data rate in either the voice communication mode or data communication mode is informed to the control section 12 as a transmission data rate.

The CDMA signal processing section 6 subjects the burst signal compressed by the speech codec 7 to a spread process using a spread code assigned to the transmission channel. Then, the CDMA signal processing section 6 subjects the spread-coded transmission signal to a quadrature modulation process and delivers the quadrature-modulated signal to a transmission circuit (TX) 5.

On the other hand, the analog audio circuit 19 modulates a carrier signal by the input analog transmission call signal, using an analog modulation method such as an FM modulation method. The analog audio circuit 19 outputs the modulated carrier signal to the transmission circuit (TX) 5.

The transmission circuit 5 mixes the input quadrature-modulated signal or carrier signal with a transmission local oscillation signal produced from the frequency synthesizer 4, and converts the resultant signal to a radio frequency signal. Based on the transmission data rate informed from the control section 12, the transmission circuit 5 subjects only an effective component of the radio frequency signal to radio frequency amplification and outputs the RF amplified signal as a transmission radio frequency signal. The transmission radio frequency signal produced from the transmission circuit 5 is fed to the antenna 1 via the duplexer 2. The transmission radio frequency signal is then burst-transmitted to the base station (not shown) from the antenna 1.

An input section 14 is provided with keys including a dial key, a send key, a power key, an end key, a volume control key, and a mode designating key. The display section 15 is provided with an LCD display and an LED. The LCD display displays, for example, information in a phone book, an incoming call and an outgoing call history, a telephone number of a counter-part terminal, and an operation state of this terminal. The LED is turned on or flickered when an incoming call has been received or when a discharge state of a battery 16 is indicated, that is, information demanding recharging of the battery 16 is displayed.

Reference numeral 17 denotes a power supply circuit. Based on an output from the battery 16, the power supply circuit 17 produces a predetermined power supply voltage Vcc and supplies it to each circuit component. The power supply circuit 17 includes a recharging circuit for recharging the battery 16.

The control section 12 includes, for example, a microcomputer as a main control unit. In addition to conventional control functions such as a radio communication control function and a position register control function, the control section 12 has a base station acquisition control function 12a and a communication mode display control function 12b as control functions relating to the present invention. The radio communication control function executes a radio channel connection control in accordance with a incoming call and outgoing call, thus enabling voice communication or data communication.

The base station acquisition control function 12a executes a search for the base station BS1, BS2, . . . , when power is turned on, when a idle handoff is effected in a standby state, when a handoff is effected during information communication, or when selection or re-selection of the system is effected. Based on the search result, the base station that meets the condition for communication is selected, and a process for acquiring the selected base station is performed.

In the communication mode display control function 12b, a control message is received from the base station acquired by the base station acquisition control function 12a, and data indicative of the communication mode is extracted from the received control message. Based on the extracted data, display data for notifying the user of the communication mode is produced and the produced display data is displayed on the LCD display of the display section 15. A mark representative of the communication mode, for instance, is used as the display data.

The base station acquisition control function 12a and communication mode display control function 12b are realized by causing the microprocessor of control section 12 to execute programs. The programs are stored in a program memory in the control section 12 or in a program storage area in the storage section 13.

There are three methods of storing the programs in the program memory or the program storage area: 1) to record programs by means of a program writer at the time of manufacture or assembly, 2) to read programs from an external memory such as a CD-ROM or a memory card at the time of starting the operation of the terminal and to write the read programs in the program memory or the program storage area, and 3) to download programs from the Web site of a communication service provider or a manufacturer via a communication network, and to write the downloaded programs in the program memory or program storage area.

The operation of the mobile communication terminal MS with the above structure will now be described.

Figure 3:
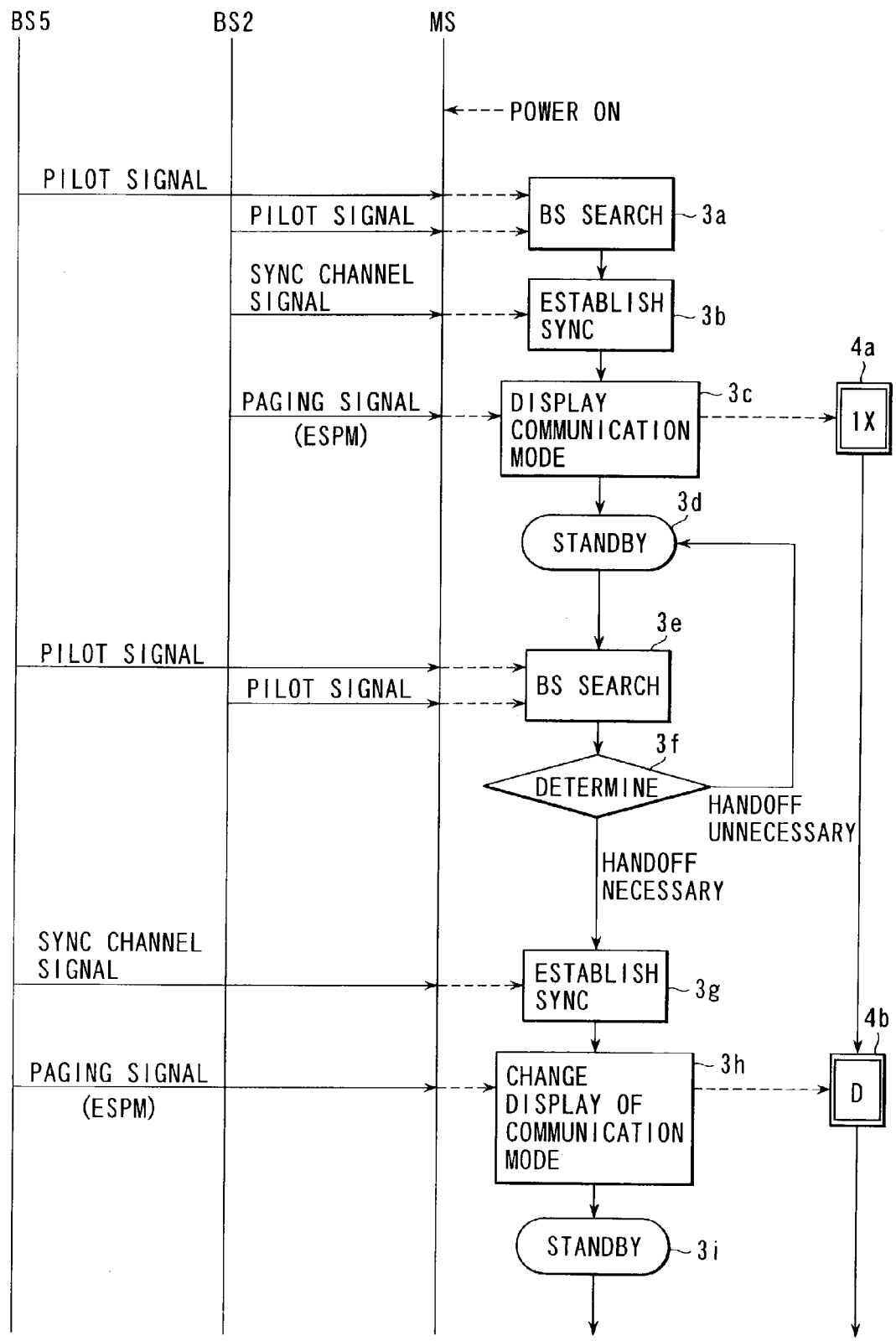
FIG. 3 shows a control sequence illustrating the procedures and contents of a communication mode display control which is performed in the mobile communication terminal shown in FIG. 2, when power is turned on or when an idle handoff is executed in a standby state.

When power has been turned on or when a handoff is effected in the standby state, the mobile communication terminal MS performs the following communication mode display operation. FIG. 3 shows a sequence illustrating the control procedures and control contents.

When power has been turned on, the control section 12 of the mobile communication terminal MS executes a base station search process in step 3a. In the base station search process, the terminal MS successively receives pilot signals transmitted from neighboring base stations and measures the quality of reception of the pilot signals. Based on a measured result of the quality of reception, the best base station to be acquired is selected.

Assume that the mobile communication terminal MS is located at a boarder area between the radio area E2 and radio area E5, as shown in FIG. 1. Assume also that the quality of reception of the pilot signal from the base station BS2 is higher than that of the pilot signal from the base station B5. In this case, the control section 12 of the mobile communication terminal MS receives a sync channel signal sent from the selected base station BS2 and performs a process for establishing sync with the base station BS2 on the basis of the sync channel signal (step 3b). If sync is established, the reception channel is switched to the paging channel, and the control section 12 is set in the standby state (step 3d). At this time, the control section 12 executes a process for displaying information representing the communication mode in step 3c.

To be more specific, the control section 12 receives an extended system parameters message (ESPM) sent from the base station BS2 over the paging channel. FIG. 4 shows a format of the ESPM. Data indicative of the communication mode used by the base station BS2 is extracted from a P_REV field P1 of the received ESPM. Based on the extracted data, a display mark of the communication mode is generated. The generated display mark is displayed on a PICT information display area 15a of the LCD display provided in the display section 15.

Figure 7:
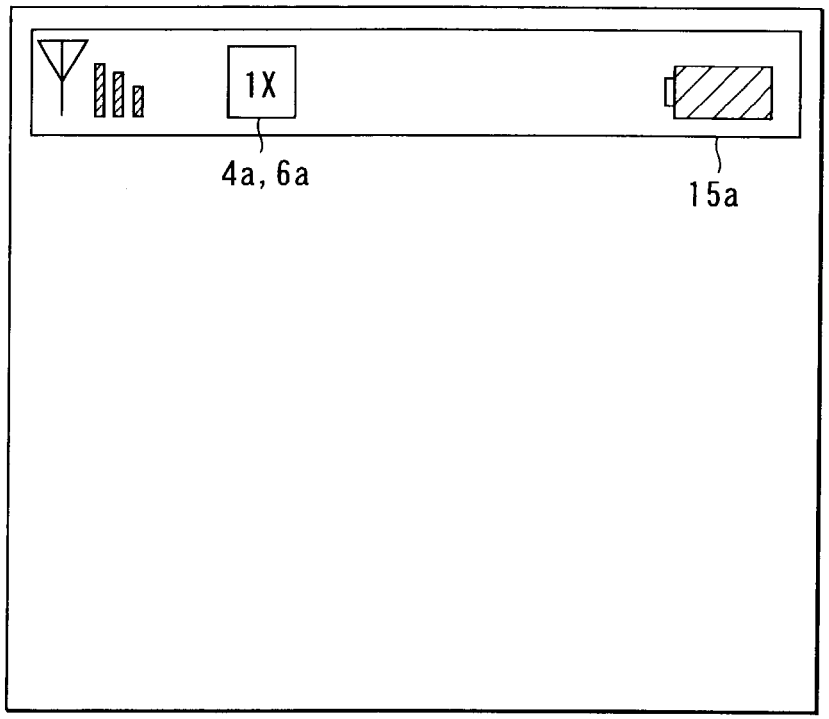
FIG. 7 shows an example of a first display image of a communication mode according to the communication mode display control shown in FIGS. 3 and 5.

If the communication mode of the base station BS2 is IS2000-1X, data representative of IS2000-1X is put in the P_REV field P1 of the incoming ESPM from the base station BS2. Thus, the PICT information display area 15a of LCD display displays mark "1X" indicative of the IS2000-1X. In FIG. 7, numeral 4a denotes an example of display.

The user can confirm the communication mode of the base station BS2 acquired by the terminal, on the basis of the mark 4a displayed on the PICT information display area 15a.

The control section 12 in the standby state 3d periodically performs a base station search in step 3e. Based on the quality of reception of the pilot signal from the neighboring base stations, which is measured by the base station search, the control section 12 determines in step 3f whether an idle handoff is necessary or not.

Assume that the mobile communication terminal MS has moved closer to the base station BS5, as indicated by MS' in FIG. 1. In this case, the quality of reception of the pilot signal from the base station BS5 becomes higher than that of the pilot signal from the base station BS2. The control section 12 thus determines that a handoff is necessary and advances to step 3g. In step 3g, the control section 12 receives a sync channel signal sent from the base station BS5 and executes an operation for establishing sync with the base station BS5 on the basis of the sync channel signal. If sync is established, the reception channel is switched to the paging channel, and the control section 12 is set in the standby state 3*i*. At this time, the control section 12 executes a communication mode display changing process in step 3*h*.

To be more specific, the control section 12 receives an ESPM sent from the base station BS5 (i.e. a handoff destination) over the paging channel, and extracts data representative of the communication mode used by the base station BS5 (the handoff destination) from the P_REV field P1 of the received ESPM. Based on the extracted data, a display mark of the communication mode is generated. The generated display mark is displayed on the PICT information display area 15*a* of the LCD display.

Figure 8:
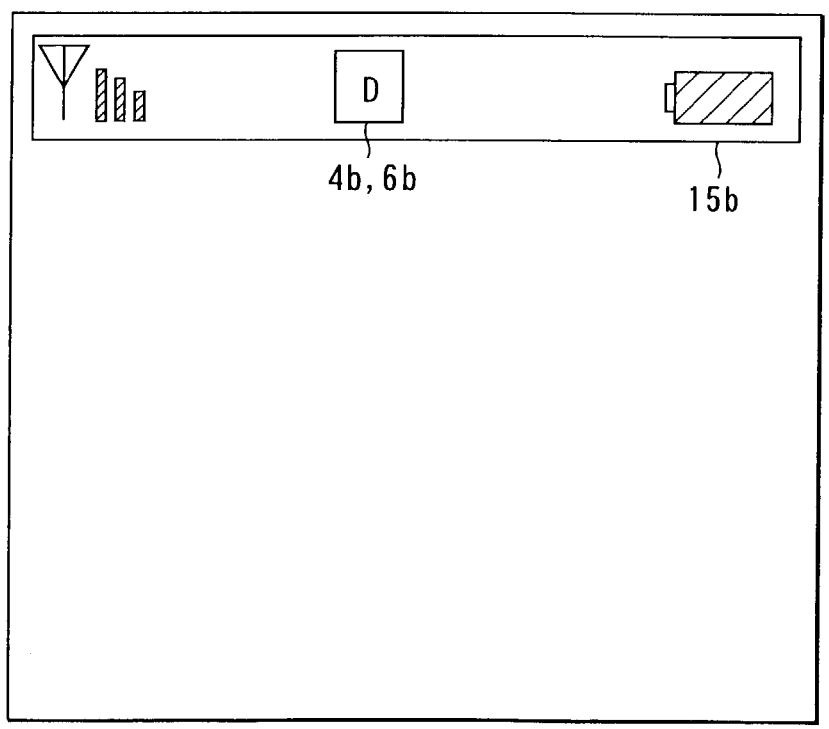
FIG. 8 shows an example of a second display image of a communication mode according to the communication mode display control shown in FIGS. 3 and 5.

If the communication mode of the base station BS5 of the handoff destination is IS95A or 95B, data representative of IS95A or 95B is put in the P_REV field P1 of the incoming ESPM from the base station BS5. Thus, the PICT information display area 15*a* of LCD display displays mark "D" indicative of the IS95A or 95B. In FIG. 8, numeral 4*b* denotes an example of display.

The display of "1X" indicative of the communication mode of the base station BS2 (i.e. a handoff origin) is kept until the communication mode "D" of the base station BS5 of the handoff destination is displayed. In short, the communication mode of the base station BS2 of the handoff origin is displayed during the idle handoff process.

The user can thus confirm the communication mode of the base station BS5 acquired by the mobile communication terminal MS' even after the idle handoff. Therefore, the user can confirm the communication mode and performs the information communication of the format suitable for the usable communication mode.

For example, when large-volume data communication is to be performed as in a case of downloading image content or music content from a Web page or a Web site, this data communication can be performed when the IS 2000-1X standard with the high-speed data transmission mode is usable.

Figure 5:
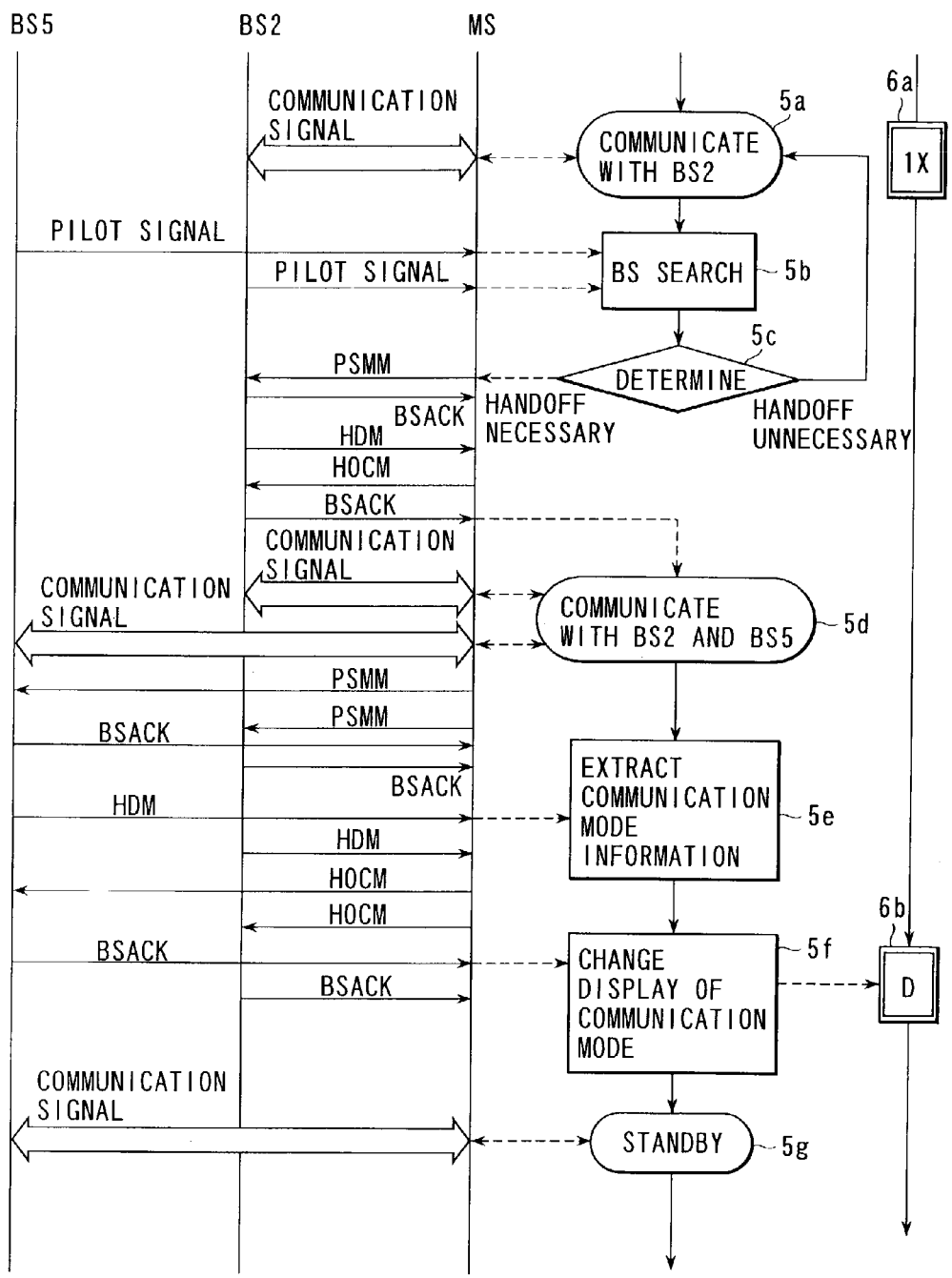
FIG. 5 shows control sequences illustrating the procedures and contents of a communication mode display control which is performed in the mobile communication terminal shown in FIG. 2, when a handoff is executed during information communication.

A communication mode display control in the case where a handoff is effected during the information communication will now be described. FIG. 5 shows a sequence illustrating the control procedures and control contents.

Assume that the mobile communication terminal MS is performing radio communication with the base station BS2 according to the IS2000-1X standard. At this time, the PICT information display area 15*a* of the LCD display displays the mark "1X" indicating that the communication mode in use is IS2000-1X.

In this communication state 5*a*, the control section 12 periodically performs a base station search in step 5*b*. Based on the quality of reception of the pilot signal from the neighboring base stations, which is measured by the base station search 5*b*, the control section 12 determines in step 5*c* whether an idle handoff is necessary or not.

Assume that the mobile communication terminal MS has moved closer to the base station BS5, as indicated by MS' in FIG. 1. In this case, the quality of reception of the pilot signal from the base station BS5 becomes higher than that of the pilot signal from the base station BS2. The control section 12 thus determines that a handoff is necessary and executes the following handoff process.

To start with, the control section 12 prepares a message (PSMM: Pilot Strength Measurement Message) representative of the quality of reception of the pilot signal from each of the neighboring base stations, which has been measured by the base station search 5*b*, and sends the PSMM to the base station BS2 which is currently acquired. Upon receiving the PSMM, the base station BS2 returns an acknowledge message (BSACK) for the PSMM to the mobile communication terminal MS. Then, the base station BS2 prepares a message indicative of the handoff destination (EHDM (Extended Handoff Direction Message) or GHDM (General Handoff Direction Message) and sends the EHDM or GHDM to the mobile communication terminal MS requesting the handoff.

Upon receiving the EHDM or GHDM, the control section 12 of the mobile communication terminal MS executes a process for establishing sync with the base station BS5 of the handoff destination according to the EHDM or GHDM, while maintaining the radio link with the base station BS2 that is currently acquired. If sync is established and a radio link is established by the traffic channel, the control section 12 prepares a handoff-completion message (HOCM: Handoff Completion Message) and sends it to the base station BS2 of the handoff origin. Thus, the mobile communication terminal MS passes into a state 5*d* in which the terminal MS is connected to both the base station BS2 of the handoff origin and the base station BS5 of the handoff destination.

In this state, the control section 12 of mobile communication terminal MS monitors the quality of reception of the pilot signals from the base station BS2 of the handoff origin and the base station BS5 of the handoff destination. If a difference in quality between both pilot signals exceeds a threshold, the control section 12 sends a PSMM to each of the base stations BS2 and BS5. Upon receiving the PSMM, each of the base stations BS2 and BS5 returns an acknowledge message BSACK to the mobile communication terminal MS of the handoff request origin. In addition, each of the base stations BS2 and BS5 prepares an EHDM or GHDM and sends it to the mobile communication terminal MS. FIG. 6 shows a format of the EHDM.

Upon receiving the EHDM or GHDM from each of the base stations BS2 and BS5, the control section 12 of the mobile communication terminal MS releases the radio link with the base station BS2 of the handoff origin according to the instruction of the EHDM or GHDM. If this radio link release process is completed, the mobile communication terminal MS prepares an HOCM and sends it to each of the base station BS2 of the handoff origin and the base station BS5 of the handoff destination. Thus, the mobile communication terminal MS passes into a state 5*g* in which it is connected to only the base station BS5 of the handoff destination.

In step 5*e* of the handoff process, the control section 12 of mobile communication terminal MS extracts data representative of the communication mode used by the base station BS5 of the handoff destination from the P_REV field P2 of the EHDM or GHDM sent from the base station BS5 of the handoff destination. In step 5*f*, upon confirming the reception of an acknowledge message BSACK from the base station BS5 of the handoff destination in response to the HOCM, the control section 12 generates a display mark of the communication mode based on the data extracted from the P_REV field P2, and displays it on the PICT information display area 15*a* of the LCD display.

For example, if the communication mode of the base station BS5 of the handoff destination is IS95A or 95B, the PICT information display area 15*a* of the LCD display displays mark "D" indicative of the IS95A or 95B standard, as shown in FIG. 8 by numeral 6*b*.

In the above handoff process, the display of "1X" indicative of the communication mode of the base station BS2 of the handoff origin is kept until the reception of the HDM from the base station BS5 of the handoff destination and the completion of the handoff process. In short, in the handoff process in the information communication, too, the communication mode of the base station BS2 of the handoff origin is displayed until the completion of the series of handoff process procedures.

Accordingly, even when the handoff is effected during the information communication and consequently the communication mode has changed, the use can also recognize the change of the communication mode. For example, when the communication mode has been changed from IS2000-1X to IS95A or 95B during large-volume data communication, the user can return to the radio communication area E2 of base station BS2 or finish the data communication in an incomplete state.

As has been described above, according to the present embodiment, the data representative of the communication mode is extracted from the P_REV field P1, P2 of the ESPM, EHDM or GHDM coming from the newly acquired base station, when the power is turned on, when the idle handoff is performed in the standby state, or when the handoff is effected in the information communication. Based on the extracted data, the display mark indicative of the communication mode used by the acquired base station is generated, and the generated mark is displayed on the PICT information display area 15a of the LCD display.

Accordingly, the user can always confirm the communication mode of the base station acquired by his/her mobile communication terminal MS, when the idle handoff is effected in the standby state, or when the handoff is effected during the information communication, as well as when the power is turned on. Therefore, the user can confirm the displayed communication mode and select the information communication of the format suitable for the usable communication mode.

The present invention is not limited to the above-described embodiment. For example, in the above embodiment, a handoff is performed between a plurality of base stations belonging to one mobile communication system. However, the communication mode display control of the present invention can be applied to the case where a so-called system selection is performed to switch the system of connection destination among a plurality of mobile communication systems. In this case, too, an incoming system parameter message is received from a base station of a system which has been newly selected by the system selection process. Data representative of the communication mode is extracted from the received message, and informed to the user. In this fashion, the communication mode display control can similarly be realized.

In the above-described embodiment, when power has been turned on, data representative of the communication mode is extracted from the P_REV field set in the ESPM sent from the acquired base station over the paging channel, and the extracted data is displayed. Alternatively, data representative of the communication mode may be extracted from the P_REV field set in the sync channel message sent from the acquired base station, and the extracted data is displayed.

In the above embodiment, a soft handoff has been described as a handoff operation during information communication. However, this invention is also applicable to a hard handoff including radio frequency changes.

When the communication mode has been changed by the handoff process, the display mark "1X" or "D" indicating the changed communication mode may be flickered, or a display message indicating the change of the communication mode may additionally be generated and displayed. Moreover, the change of the communication mode may be reported to the user by alerting sound or vibration. Thereby, the user can clearly recognize the change of the communication mode.

The communication mode indication means is not limited to the displaying of the mark representative of the communication mode. A display message indicating the communication mode may be generated and displayed. In addition, a voice message indicating the communication mode may be generated using speech synthesis technology and output from a loudspeaker.

In the above embodiment, the mobile communication system wherein a base station using IS95A/95B and a base station using IS2000-1X are mixedly present has been described by way of example. The invention is also applicable to systems wherein base stations using other communication modes are mixedly present.

Means for designating and inputting a communication mode desired by the user may be provided. It is determined whether the communication mode of the acquired base station agrees with the desired communication mode designated by the user. If the communication modes do not coincide, a message to this effect, together with information representative of the communication mode, is informed to the user. Thereby, if a base station using the communication mode desired by the user has not been acquired, the user can clearly recognize this fact. The possibility of communication being performed with an undesired communication mode can further be reduced.

A function of accepting a base station re-acquisition request and a base station re-acquisition control function may further be provided. Assume that the user, who was notified of the communication mode, has input a re-acquisition request for changing the already acquired base station to a base station using the desired communication mode. In this case, a search for neighboring base stations is conducted once again according to the request. Based on the search result, it is determined whether there is a base station using the communication mode desired by the user. If there is an acquirable base station among base stations using the communication mode desired by the user, a process is executed to change the acquired base station to this one. If there is no acquirable base station among base stations using the communication mode desired by the user, a message indicating the impossibility of change of the base station and the reason therefor is generated and informed to the user while the already acquired base station is maintained.

With this structure, when a base station using the desired communication mode is not acquired, the user can make the terminal execute re-acquisition of the base station by a simple operation. In addition, when a base station using the desired communication mode cannot be acquired, the user can clearly recognize this fact and the reason. Accordingly, the user can clearly know the reason why the desired communication mode cannot be used, and the user can take an appropriate measure, for example, by moving into a radio area of some other base station.

In the above embodiment, in the idle handoff effected in the standby state, the communication mode is displayed on the basis of the paging signal first sent from the base station with which the terminal has been synchronized. Then, the terminal is set in the standby state. Alternatively, after the terminal passes in the standby state, paging signals that are periodically sent from base stations may be received to detect the P-REV value. The just detected value and the previously received value are compared, and the display of the communication mode may be updated if there is change or addition.

The kinds of communication modes, the kinds and structures of the mobile communication terminal, the communication mode indication control procedure and the contents thereof, the content of indication information (e.g. including information representative of a changed or added function), the kinds and structure of indication means, etc., may be modified without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal connectable to a first base station adapted to use a first communication mode and a second base station adapted to use a second communication mode different from the first communication mode, comprising:

means for acquiring one of the first and second base stations;

means for receiving a control message sent from the base station acquired by the acquiring means;

means for recognizing the communication mode used in the acquired base station based on the received control message; and means for indicating the recognized communication mode, wherein the recognizing means recognizes the communication mode used in the newly acquired base station when an idle handoff has been completed by the acquiring means; and the indicating means indicates the recognized communication mode used in the base station.

2. The terminal according to claim 1, wherein when the communication mode of the base station newly acquired by the acquiring means has a function in addition to the functions of the communication mode of a base station acquired immediately before the newly acquired base station, the indicating means indicates the added function.

3. The terminal according to claim 1, wherein it is determined whether the communication mode has been changed by comparing the communication mode of the base station newly acquired by the acquiring means and the communication mode of the base station acquired immediately before the newly acquired base station, and when the communication mode has been changed, the indicating means displaying, in a flickering fashion, information representative of the communication mode after the change.

4. The terminal according to claim 1, wherein the indicating means generates display information representative of the communication mode of the newly acquired base station and a display message indicative of a change of the communication mode, and causes a display section to display the generated display information and the display message.

5. The terminal according to claim 1, wherein the recognizing means receives at least one of a system parameter message, a handoff direction message and a sync channel message, which is transmitted from the base station acquired by the acquiring means, and recognizes the communication mode used in the acquired base station based on the received control message.

6. A mobile communication terminal connectable to a first base station adapted to use a first communication mode and a second base station adapted to use a second communication mode different from the first communication mode, comprising:

means for acquiring one of the first and second base stations;

means for receiving a control message sent from the base station acquired by the acquiring means;

means for recognizing the communication mode used in the acquired base station based on the received control message; and means for indicating the recognized communication mode, wherein the recognizing means recognizes the communication mode used in the newly acquired base station when a handoff has been completed by the acquiring means; and the indicating means indicating the recognized communication mode used in the base station.

7. The terminal according to claim 6, wherein when the communication mode of the base station newly acquired by the acquiring means has a function in addition to the functions of the communication mode of a base station acquired immediately before the newly acquired base station, the indicating means indicates the added function.

8. The terminal according to claim 6, wherein it is determined whether the communication mode has been changed by comparing the communication mode of the base station newly acquired by the acquiring means and the communication mode of the base station acquired immediately before the newly acquired base station, and when the communication mode has been changed, the indicating means displaying, in a flickering fashion, information representative of the communication mode after the change.

9. The terminal according to claim 6, wherein the indicating means generates display information representative of the communication mode of the newly acquired base station and a display message indicative of a change of the communication mode, and causes a display section to display the generated display information and the display message.

10. The terminal according to claim 6, wherein the recognizing means receives at least one of a system parameter message, a handoff direction message and a sync channel message, which is transmitted from the base station acquired by the acquiring means, and recognizes the communication mode used in the acquired base station based on the received control message.

11. A mobile communication terminal connectable to a first base station adapted to use a first communication mode and a second base station adapted to use a second communication mode different from the first communication mode, comprising:

means for acquiring one of the first and second base stations;

means for receiving a control message sent from the base station acquired by the acquiring means;

means for recognizing the communication mode used in the acquired base station based on the received control message; and means for indicating the recognized communication mode, wherein the recognizing means recognizes the communication mode used in the base station of a newly acquired system when selection of the system has been effected by the acquiring means between a first mobile communication system including the first base station and a second mobile communication system including the second base station, and the indicating means generates information representative of the communication mode used in the base station of the newly acquired system based on the recognized communication mode, and indicates the generated information.

12. The terminal according to claim 11, wherein when the communication mode of the base station of the system newly acquired by the acquiring means has a function in addition to the functions of the communication mode of a base station of a system acquired immediately before the newly acquired system, the indicating means indicates the added function.

13. The terminal according to claim 11, wherein it is determined whether the communication mode has been changed by comparing the communication mode of the base station of the system newly acquired by the acquiring means and the communication mode of the base station of a system acquired immediately before the newly acquired system, and when the communication mode has been changed, the indicating means displaying, in a flickering fashion, information representative of the communication mode after the change.

14. The terminal according to claim 11, wherein the indicating means generates display information representative of the communication mode of the base station of the newly acquired system and a display message indicative of a change of the communication mode, and causes a display section to display the generated display information and the display message.

15. The terminal according to claim 11, wherein the recognizing means receives at least one of a system parameter message, a handoff direction message and a sync channel message, which is transmitted from the base station of the system acquired by the acquiring means, and recognizes the communication mode used in the base station of the acquired system based on the received control message.

16. A mobile communication terminal connectable to a first base station adapted to use a first communication mode and a second base station adapted to use a second communication mode different from the first communication mode, comprising:

means for acquiring one of the first and second base stations;

means for receiving a control message sent from the base station acquired by the acquiring means;

means for recognizing the communication mode used in the acquired base station based on the received control message; and means for indicating the recognized communication mode, when the acquiring means has executed an acquisition destination changing process between the first base station and the second base station, the indicating means continues indicating information representative of the communication mode of the base station before the change, until the communication mode of the base station after the change is recognized.

17. A mobile communication terminal connectable to a first base station adapted to use a first communication mode and a second base station adapted to use a second communication mode different from the first communication mode, further comprising:

means for acquiring one of the first and second base stations;

means for receiving a control message sent from the base station acquired by the acquiring means;

means for recognizing the communication mode used in the acquired base station based on the received control message;

means for indicating the recognized communication mode;

means for designating and inputting a communication mode desired by a user of the mobile communication terminal;

means for determining whether the communication mode of the base station newly acquired by the acquiring means agrees with the desired communication mode designated and input by the user through the designating means; and means for generating a message indicative of a determination result of the determining means and providing the generated message to the user.

18. A mobile communication terminal connectable to a first base station adapted to use a first communication mode and a second base station adapted to use a second communication mode different from the first communication mode, further comprising:

means for acquiring one of the first and second base stations;

means for receiving a control message sent from the base station acquired by the acquiring means;

means for recognizing the communication mode used in the acquired base station based on the received control message;

means for indicating the recognized communication mode;

means for inputting a change request for a change to a communication mode desired by the user of the mobile communication terminal;

means for detecting an acquirable one of the first and second base stations according to the change request;

means for determining whether the base station using the desired communication mode designated by the user according to the change request is present among base stations detected by the detecting means; and means for acquiring the base station using the desired communication mode, when the base station using the desired communication mode has been determined to be present.

19. The terminal according to claim 18, further comprising:

means for providing a message when it has been determined that the base station using the communication mode desired by the user is not present.

* * * * *